United States Patent [19]

Barnack

[11] 4,321,817
[45] Mar. 30, 1982

[54] SHEET BENDING BRAKE

[75] Inventor: Henry C. Barnack, W. Springfield, Mass.

[73] Assignee: Tapco Products Company, Inc., Detroit, Mich.

[21] Appl. No.: 130,988

[22] Filed: Mar. 17, 1980

[51] Int. Cl.³ .......................... B21D 5/04; B21D 11/04
[52] U.S. Cl. .................................... 72/319; 267/36 A
[58] Field of Search ................. 72/319, 320, 322, 323, 72/321, 297; 267/164, 42, 36 A, 177

[56] References Cited

U.S. PATENT DOCUMENTS

| | | | |
|---|---|---|---|
| 124,863 | 3/1872 | Sugden et al. | 72/320 |
| 759,507 | 5/1904 | Ericson et al. | 267/42 |
| 2,321,854 | 6/1943 | Rabezzana et al. | 72/319 |
| 3,481,174 | 12/1969 | Barnack | 72/319 |
| 3,482,427 | 12/1969 | Barnack | 72/319 |
| 3,663,048 | 5/1972 | Zimmerle | 267/42 |
| 4,237,716 | 12/1980 | Onisko | 72/319 |

FOREIGN PATENT DOCUMENTS

| | | | |
|---|---|---|---|
| 634263 | 2/1928 | France | 72/319 |
| 108325 | 8/1945 | Sweden | 72/319 |

Primary Examiner—Daniel C. Crane

[57] ABSTRACT

A sheet bending brake comprising a frame having a fixed jaw and a movable jaw and an anvil member adjustable secured to the fixed jaw. The movable jaw having a clamping surface movable between workpiece clamping and non-clamping positions relative to the anvil member. A bending member is hingedly connected to the fixed jaw. The movable jaw is releasably locked in workpiece clamping position by a structure that includes an oval shaped spring member having opposed ends and opposed walls, said member is pivoted at one end to said movable jaw and at the other end to a handle for manipulating the jaw.

7 Claims, 6 Drawing Figures

SHEET BENDING BRAKE

This invention relates to sheet metal brakes for bending sheet metal or plastic.

BACKGROUND AND SUMMARY OF THE INVENTION

In my U.S. Pat. Nos. 3,481,174 and 3,482,427, there is disclosed and claimed a sheet metal brake for bending metal or plastic sheets as are used in siding on homes and buildings.

This invention is directed to an improved sheet metal brake incorporating novel means for varying the force with which the workpiece is clamped prior to bending.

In accordance with the invention, a spring force for clamping the sheet to be bent is provided by an oval shaped spring member interposed between the member that engages the sheet and a clamping handle. Provision is made for changing the distance between the sides of the oval shaped spring to vary the spring force.

DESCRIPTION OF THE DRAWINGS

FIG. 1A is a fragmentary view in perspective of a modified form of handle means for the brake;

DESCRIPTION

Figure 1:
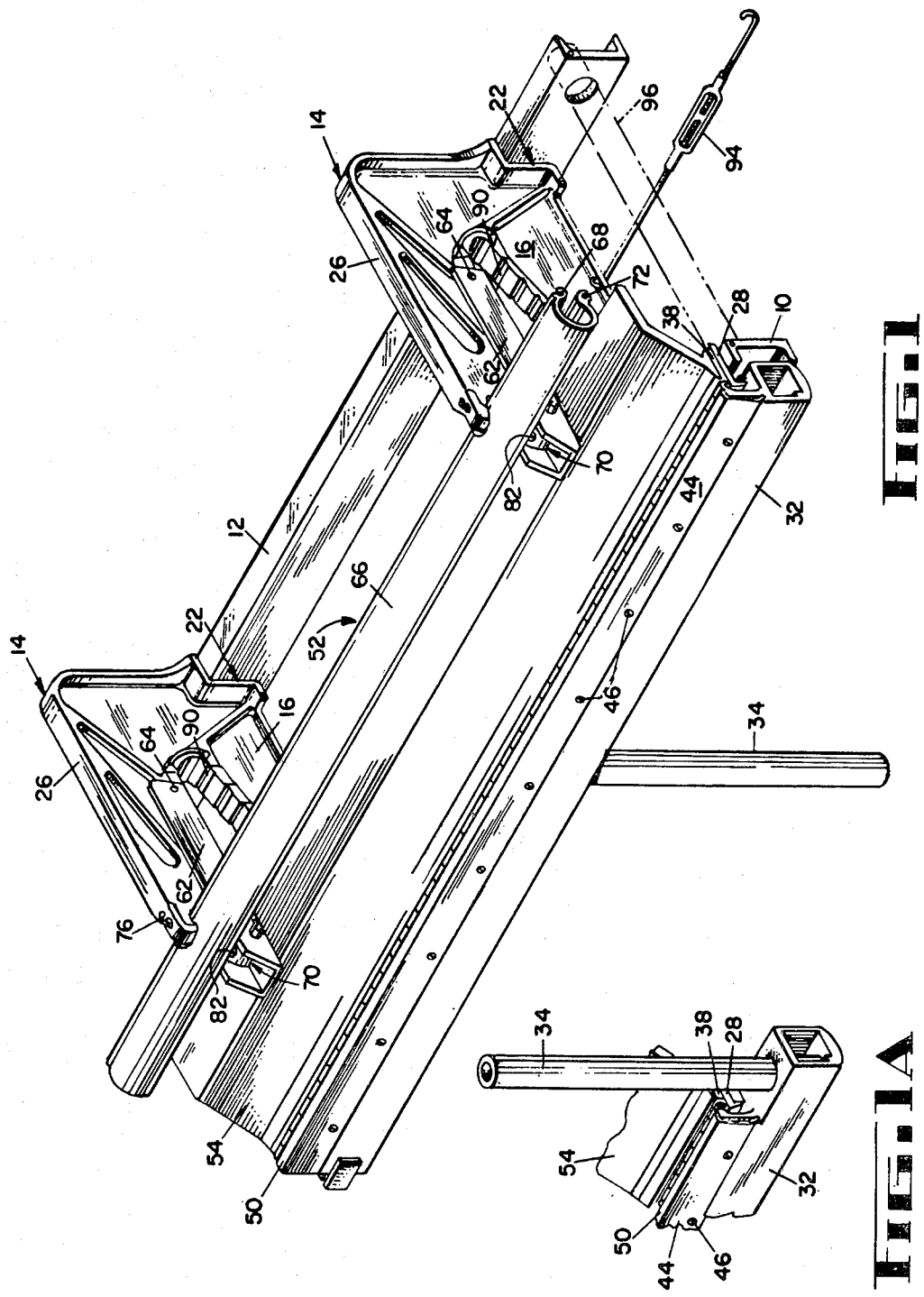
FIG. 1 is a perspective view of a brake embodying the invention.

The brake is adapted to be placed upon a bench, pair of horses, or like supporting contrivances (not shown) so as to dispose the brake at a convenient height above the ground or floor for operating purposes.

The brake is organized with reference to a bed or table in the form of a pair of channel-shaped rails 10 and 12 formed preferentially of aluminum extrusions and disposed in spaced parallelism to each other.

Conceivably, a single rail of adequate dimensions could be used in lieu of the pair of such rails.

Longitudinally-spaced C-shaped frames generically designated by reference character 14 are provided, each including a lower arm 16 which is so designed as to define a front side face recess 18 to which rail 10 is bolted as by bolts 20 and a rear side face recess 22 to which rail 12 is bolted as by bolts 24, the C-frames also including an upper arm 26 which overlies the lower arm in spaced relation thereto, whereby is provided an open jaw.

A lower jaw 28 in the form of a T-shaped aluminum extrusion is fixed as by bolts 30 on the upper planar surface of lower arm 16 adjacent the forward edge thereof, and a bending bar 32 in the form of an aluminum extrusion having generally the shape of the numeral 6 is hinged thereto.

One or more bending bar handle members 34 are fixed to the bending bar for facilitating movement thereof, the handle members either depending from the bending bar, as shown in FIG. 1, or extending upwardly therefrom, as shown in FIG. 1A.

Lower jaw 28 and bending bar 32 are formed with mating integral projections along their longitudinal edges, which projections are provided with openings coaxially aligned when the projections are intermeshed so that a pin 36 may be extended through the openings to complete the hinge. In this manner, bending bar 32 is hinged to lower jaw 28 along an axis.

A shiftable anvil plate 38 is provided in overlying relation to the upper planar surface of lower jaw 28 and is adjustably secured thereto by screws 40 which extend through elongated slots 42 in the lower jaw and are threadedly engaged in anvil plate 38.

Figure 2:
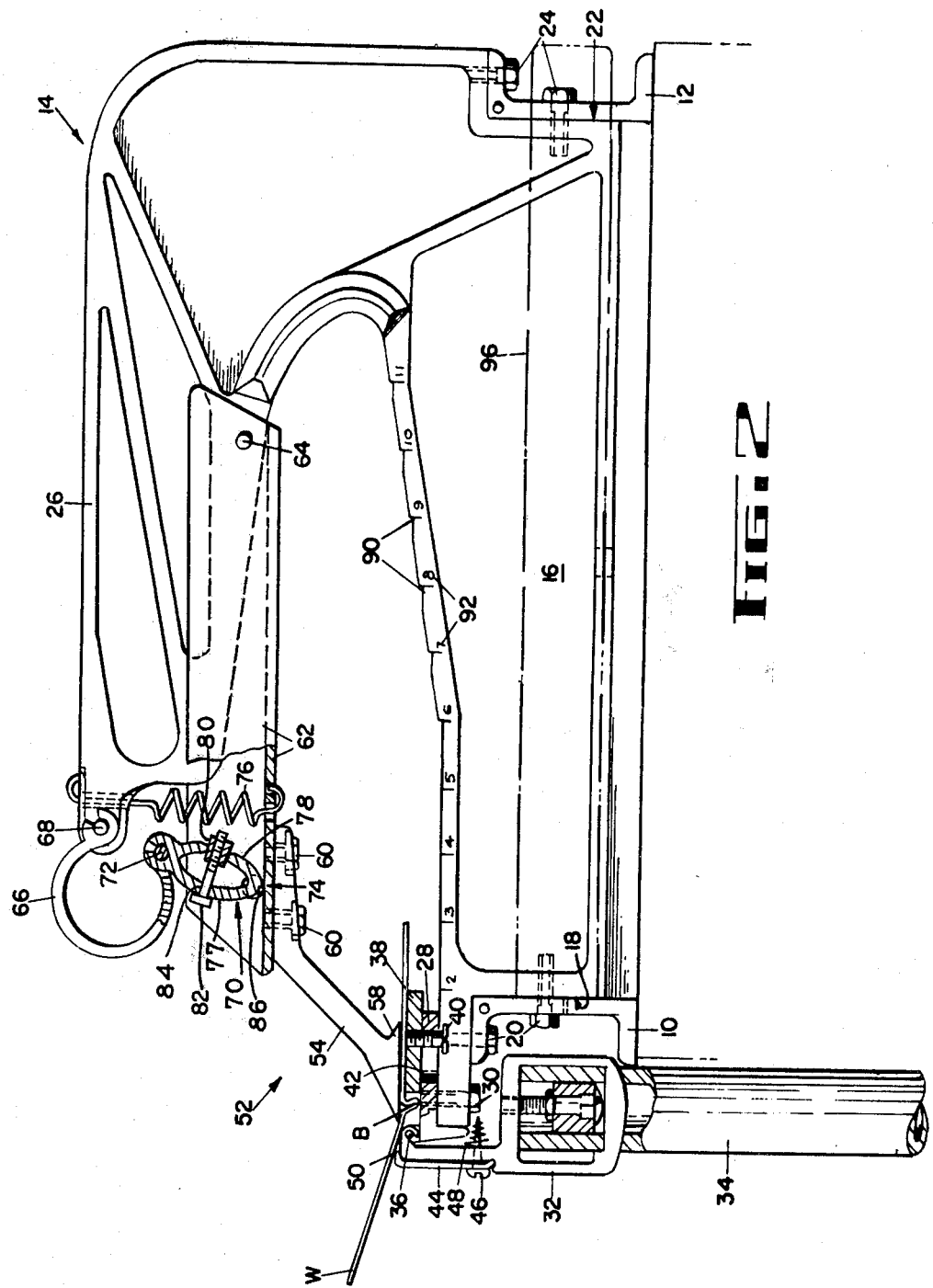
FIG. 2 is an enlarged, fragmentary end elevational view showing the brake in work clamping position, with portions of the brake broken away for clarity.

As shown in FIG. 2, the anvil plate may be shifted rearwardly relative to the lower jaw to provide a suitable recess immediately adjacent the hinge connection between the bending bar and lower jaw, in which recess the prebent portion B of a sheet metal workpiece W is receivable.

Figure 3:
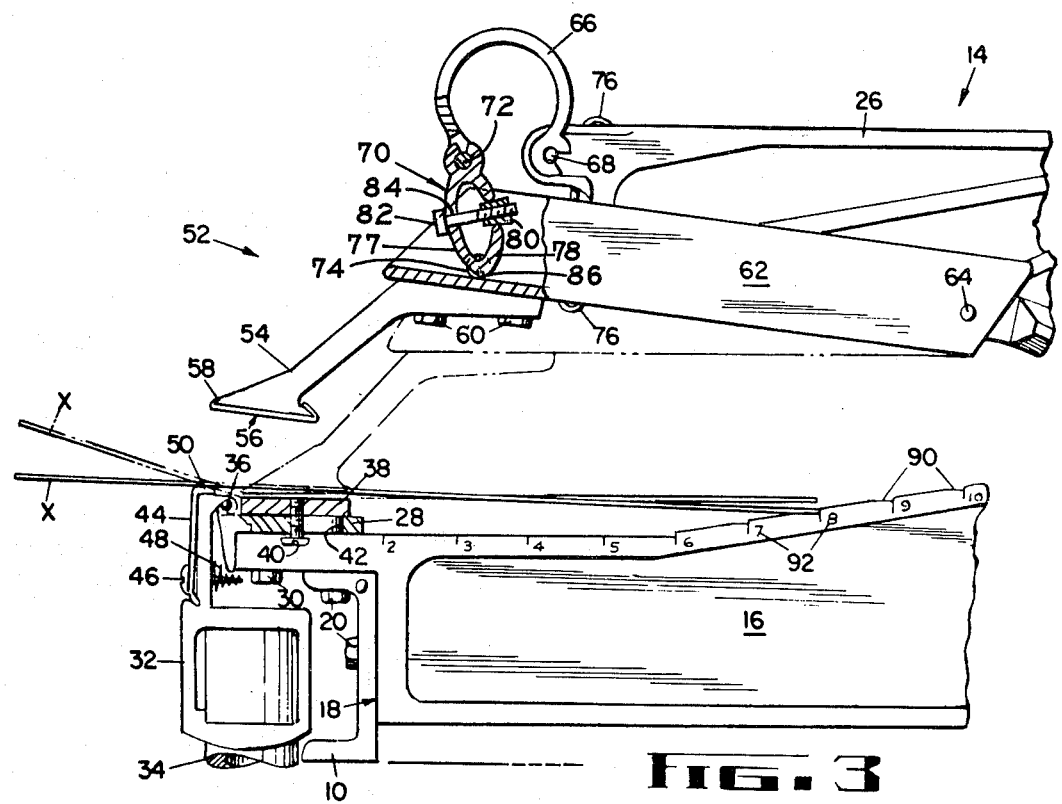
FIG. 3 is a fragmentary view similar to FIG. 2 showing the action of the brake clamping member in its movement between non-clamping and clamping positions.
Figure 4:
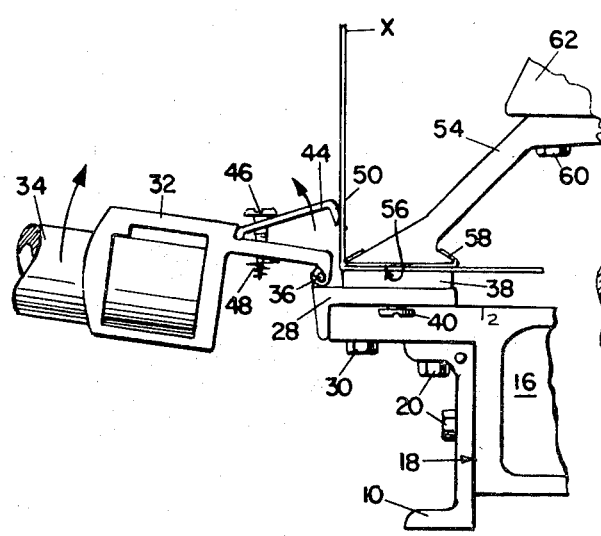
FIGS. 4 and 5 are fragmentary views similar to FIG. 3 showing the action of the several bending bar components during the bending of a workpiece.
Figure 5:
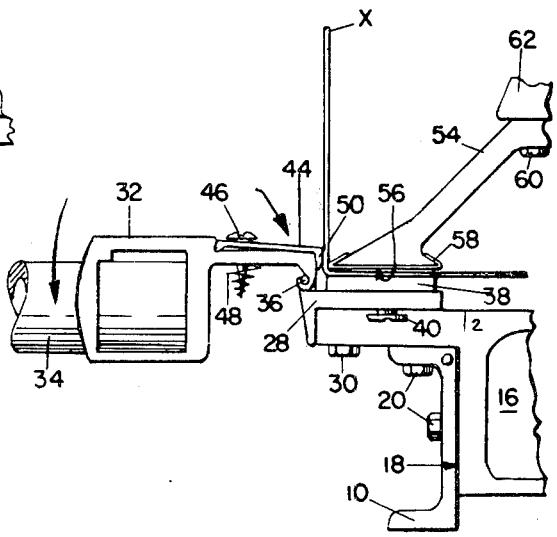

For the usual flat sheet metal workpiece, as shown at X in FIGS. 3-5, the anvil plate is shifted forwardly so that its lending or forward longitudinal edge is disposed closely adjacent the aforementioned hinge connection.

A generally L-shaped floating hinge compensator 44 is provided in overlying relation to the upper planar surface of bending bar 32 and is pivotally secured thereto by spring-loaded screws 46 which extend loosely through openings adjacent the lower edge of the compensator and through appropriately aligned openings in the bending bar.

The innermost ends of the screws extend outwardly from the bending bar and have compression springs 48 threaded thereon in lieu of the usual securing nuts, the springs bearing at one end on the bending bar.

Hinge compensator 44 is provided along its opposite or outermost longitudinal edge with a foot portion 50 which normally overlies and rests against the outwardly facing surface defined by the hinge connection between the bending bar and the lower jaw.

As shown in FIGS. 2 and 3, when the bending bar is in non-use position, the foot portion of the hinge compensator overlies the hinge connection and is disposed in a horizontal plane above that of the anvil plate 38.

As the bending bar is swung upwardly from the FIG. 3 position to the FIG. 4 position, the compensator pivots relative to the screws 46, with foot portion 50 thereof riding upwardly relative to the lower planar surface of the workpiece, which is clamped relative to the anvil plate by a clamping subassembly to be described.

When the workpiece has been bent to the desired angular shape, the bending bar is swung downwardly whereupon the foot portion of the compensator rides downwardly to return to its normal position wherein it overlies the hinge connection.

The clamping subassembly, generally indicated by 52, includes a clamping member 54 provided with sharp tapered lowermost front and rear edges defining a flat clamping surface 56 which is coextensive in length and with anvil plate 38, the clamping surface preferably having a boot 58 of suitable hard, wear-resistant material in the nature of stainless steel or the like sleeved thereon for better wearability.

Clamping member 54 is fixed at its opposite upper end as by bolts 60 to the lower surface of the outermost end of a channel-shaped pivot bar 62 which is pivoted at its opposite innermost end to upper arm 26 of each C-frame 14 as by a pivot pin 64.

A handle member 66 is linked to the pivot bar, whereby the clamping member may be moved into overyling relation to the shiftable anvil plate to clamp the workpiece of sheet metal against the flat surface of the anvil plate in clamping relation as shown in FIG. 3.

Handle member 66 is pivoted along one of its edges as by a pivot pin 68 to the forward end of upper arm 26 of each C-frame 14 and is pivotally connected to pivot bar 62 by a spring member 70 pivoted at its upper end as at 72 to an edge of the handle member 66 and at its lower end as at 74 to the pivot bar 62.

A tension spring 76 fixed at one end to upper arm 26 and at its opposite end to pivot bar 62 spring-loads clamping subassembly 52.

Each spring 70 is made of metal as by extrusion and is generally oval-shaped in cross-section including a front wall 76, a rear wall portion 78 extending toward one another with a space therebetween. A wedge 80 extends into the space and a screw 82 extends through front wall 76 and is threaded into the wedge 80. By threading screw 82 inwardly and outwardly the distance between walls 76, 78 is charged so that spring force of spring member 70 can be varied.

Spring member 70 is formed with an opening 84 at its upper end through which a pin 72 is positioned and extends into an opening in handle member 66 to pivot spring member 70 to the handle member. A clip 86 having spaced arms extends through an opening in bar 62 and telescopes over the lower end of spring member 70 to pivot the spring member 70 to bar 62.

In use, a workpiece is properly positioned relative to lower arm 16 so that it rests upon anvil member 38 and foot portion 50 of hinge compensator 44, the anvil member first having been positioned according to the presence or absence of a prebent portion in the workpiece.

Handle member 66 is now swung downwardly to bring clamping surface 56 of clamping member 54 into contact with the upper planar surface of the workpiece and the handle member is rotated counterclockwise as viewed in FIGS. 2 and 3 to bring the pivot 72 over center of a line joining pivots 68 and 74, thereby effectively locking the clamping subassembly relative to the workpiece and anvil member.

Bending bar handle member 34 is not swung upwardly to cause the foot portion 50 of the compensator 44 to pivot upwardly relative to bending bar 32 thereby causing the workpiece to bend along the forward edges of the anvil plate and clamping member.

When the workpiece has been bent to the desired angle, the handle member is swung downwardly and the compensator 44 returns to its rest position.

The floating compensator makes for easier bending and will not mar the surface of the workpiece.

I claim

1. A sheet bending brake comprising
a frame having a fixed jaw and a movable jaw,
an anvil member secured to said fixed jaw,
said movable jaw having a clamping surface movable between workpiece clamping and non-clamping positions relative to the anvil member,
means for releasably locking the movable jaw in workpiece clamping position,
a bending member hingedly connected to the fixed jaw,
and a one piece, hollow, oval-shaped solid body having opposed ends and opposed walls with said ends being located on the major axis extending through the oval-shaped body, said body being pivoted at one end to said movable jaw and at the other end to said means releasably locking said jaw and including means extending between said walls for varying the distance between said walls.

2. The sheet bending brake set forth in claim 1 wherein said last-mentioned means comprises a screw extending through one wall and a wedge in said other wall into which said screw extends.

3. The sheet bending brake set forth in claim 2 wherein said other wall comprises two wall portions between which said wedge extends.

4. A sheet bending brake according to claim 1 wherein the means for releasably locking the movable jaw in workpiece clamping position comprises a handle pivoted to the frame,
a pivot bar pivoted to said frame and supporting said movable jaw,
said body being pivoted at one end to said handle and at the other end to said pivot bar.

5. The sheet bending brake set forth in claim 4 wherein said means for varying the distance between said walls, comprises a screw extending through one wall and a wedge in said other wall into which said screw extends.

6. The sheet bending brake set forth in claim 5 wherein said other wall comprises two wall portions between which said wedge extends.

7. The sheet bending brake set forth in claim 6 wherein said oval-shaped body comprises an extrusion.

* * * * *